June 27, 1944.   E. A. ZETTERQUIST   2,352,583
JOINT CONSTRUCTION
Filed Oct. 3, 1942
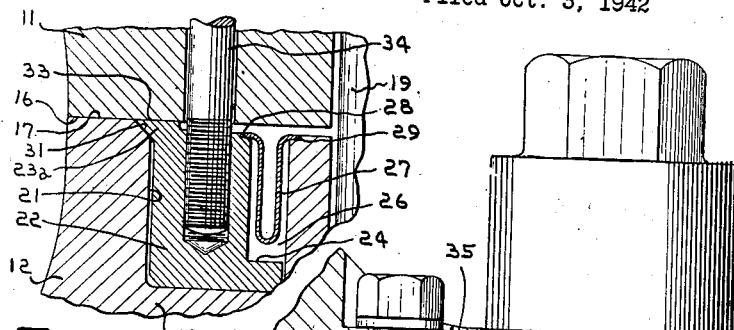
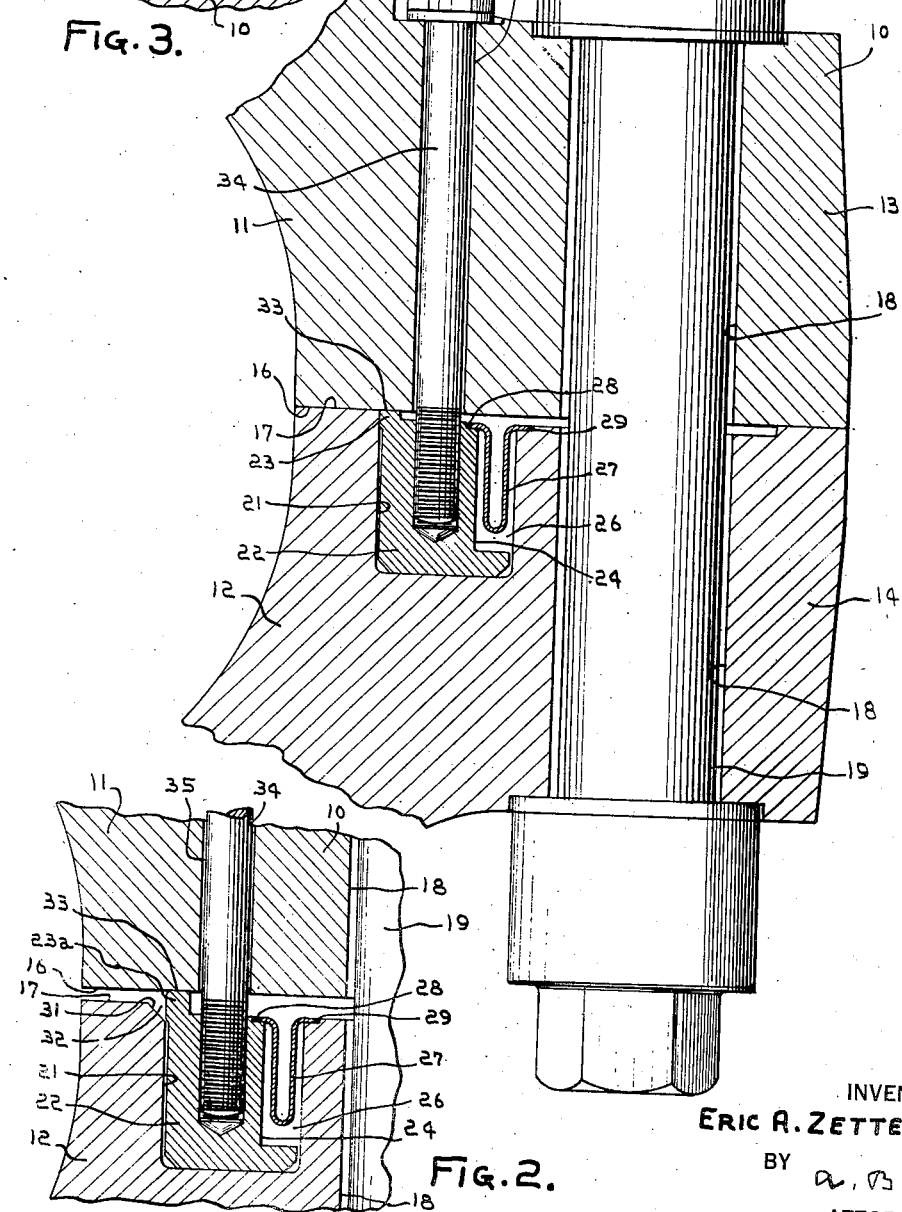
INVENTOR
ERIC A. ZETTERQUIST.
BY
ATTORNEY Patented June 27, 1944

2,352,583

UNITED STATES PATENT OFFICE 2,352,583

JOINT CONSTRUCTION

Eric A. Zetterquist, Drexel Hill, Pa., assignor to Westinghouse Electric & Manufacturing Company, East Pittsburgh, Pa., a corporation of Pennsylvania Application October 3, 1942, Serial No. 460,719

7 Claims. (Cl. 189—36)

This invention relates to casings for fluids under high temperature and/or pressure, more particularly to the joints therefor, and has for an object to provide means for securing and maintaining fluid tightness for such joints.

In certain types of apparatus, for example steam turbines, the casings may be subject to high internal temperatures and pressures, and it has been found desirable to provide the casing with heavy, bolted flanges to withstand the pressure tending to cause leakage at the joints. However, it is difficult to keep the flange faces sufficiently tight across the entire joint to prevent leakage, such difficulty being due primarily to temperature differences at inner and outer regions of the flanges and adjacent walls.

With relatively heavy walls and flanges, the temperature of the inner regions of the walls is much higher than that of the outer regions thereof, or of the flanges, this temperature difference frequently resulting in uneven expansion or warping of the surfaces forming the joint.

It is an object of the present invention to provide novel means for preventing leakage at the joints due to the above or other causes.

These and other objects are effected by the invention as will be apparent from the following description and claims taken in connection with the accompanying drawing, forming a part of this application, in which:

Fig. 1 is a fragmentary sectional view of a turbine casing joint embodying the present invention; and, Figs. 2 and 3 are fragmentary detail sectional views of a modification of the structure shown in Fig. 1.

Referring now to the drawing more in detail, there is shown a turbine casing 10, comprising an upper part 11 and a lower part 12 having integral flanges 13 and 14, respectively, the part 11 having a contact surface 16 and the part 12 having a contact surface 17, these surfaces, when in engagement, defining the joint between the two parts. The flanges 13 and 14 are provided with aligned bolt holes 18 therethrough for the reception of the usual bolts 19 for applying sealing pressure to the joint.

A groove 21 is shown as formed in the lower part 12 adjacent to the contact surface 17 and has positioned therein a sealing member 22 provided with a rib 23 for sealing engagement with the contact surface 16.

Preferably, the sealing member 22 is rabbeted at 24 to provide a space 26 for reception of a flexible sealing strip or member 27, welded at 28 to the sealing member 22 and at 29 to the part 12 in which the groove 21 is formed. This sealing strip 27 is made of U shape in order to permit of vertical movement of the sealing member 22 in the groove 21, for a purpose to be hereinafter explained.

Bolts 34 extend through bolt holes 35 in the upper part of the casing and are threadedly mounted in the sealing member 22 to draw the latter and its sealing rib 23 tightly against the upper part of the casing. It will be apparent that, with the bolts 34 tightened, should distortion or deformation of the joint occur due to uneven expansion of either or both parts resulting from temperature changes or differences, the sealing member 22 can move upwardly in the groove 21, thereby maintaining the seal between the contact surface 33 of the sealing rib and the contact surface 16 of the upper part. While upward movement of the sealing member 22 would result in leakage past the surface 16, escape of any fluid leaking therepast would be prevented by the flexible seal 27 between the sealing member 22 and the part 12.

In the modification illustrated in Figs. 2 and 3, the sealing rib 23a projects beyond the contact surface 17 and is made of deformable material (Fig. 2). The corner of the groove 21 adjacent rib 23a is chamfered, as at 31, to provide a space 32. When the two halves of the casing are bolted together with the contact surfaces 16 and 17 engaging each other, the rib 23a will be deformed in the manner illustrated in Fig. 3, the deformed material filling the space 32 and providing a relatively large contact surface 33 in engagement with the contact surface 16.

While, in the arrangement herein illustrated, the sealing member is disposed in a groove in the lower half of the casing, it will be apparent to those skilled in the art that the sealing assembly may be provided in the upper half of the casing without departure from the spirit of the present invention.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In a joint for a casing, first and second contiguous flanged portions, bolts for connecting the flanged portions, and sealing means for the joint and located between the bolts and the casing interior; said sealing means comprising a groove formed in the first flanged portion, a sealing member in the groove, means independent of said bolts for effecting sealing engagement of said sealing member with the second flanged portion, and flexible means connecting the sealing member with the first flanged portion and providing a sealed joint therebetween.

2. In a joint for a casing, first and second contiguous flanged portions, means for connecting the flanged portions, a groove formed in the first flanged portion, a sealing member in the groove, means independent of said connecting means for effecting compressive sealing engagement of the sealing member with said second flanged portion, and flexible means connecting the sealing member with the first flanged portion and providing a sealed joint therebetween.

3. In a joint for a casing, first and second contiguous flanged portions, bolts for connecting the flanged portions, a groove formed in the first flanged portion, a sealing member in the groove, a deformable rib on the sealing member projecting beyond the surface of the first flanged portion for sealing engagement with the second flanged portion, means independent of said bolts for effecting sealing engagement of said rib with the second flanged portion, and flexible means connecting the sealing member with the first flanged portion and providing a sealed joint therebetween.

4. In a casing for high temperature fluids comprising first and second parts connected by a joint, said joint including contact faces formed on said parts and flange portions integral with said parts and connecting means therefor; means for securing and maintaining joint fluid-tightness including a groove formed in the first part, a sealing member positioned in said groove, means independent of the first part for effecting compressive sealing engagement of the sealing member with the second part, and means providing a flexible seal between the sealing member and the first part so that the sealing member may move in the groove to maintain sealing engagement thereof with the second part.

5. A casing subject to high internal pressures and/or temperatures comprising a pair of parts, flange portions integral with said parts, said parts having meeting surfaces defining a joint, bolts extending through the flanges for connecting the same, means for securing and maintaining joint fluid-tightness including one of said meeting surfaces formed with a groove located inwardly of the flange bolts, a sealing member disposed in said groove, a deformable rib on said sealing member extending beyond said one meeting face for sealing engagement with the other meeting face, bolts for maintaining said sealing engagement during separation of the meeting faces due to distortion of the parts, and a flexible U-shaped sealing strip having one leg welded to the sealing member and the other leg welded to the part having the groove, whereby said sealing member may move in the groove to maintain said sealing engagement of the rib with the other meeting face.

6. Structure as specified in claim 5, wherein that edge of the groove nearest the interior of the casing is chamfered and the deformable rib is disposed adjacent thereto, whereby making-up of the casing joint causes said rib to be deformed into the space provided by said chamfer.

7. In a casing for high temperature fluids comprising a plurality of parts connected by joints, each joint including contacting portions of said parts and flanges integral therewith and extending outwardly therefrom, said contacting portions and the flanges having joint contact faces and bolts for connecting the flanges; means for securing and maintaining joint fluid-tightness including one of said contact faces formed with a groove located inwardly of the bolts, a movable sealing member disposed within said groove, means providing a flexible seal between said sealing member and the part having said one contact face, a deformable rib on the sealing member projecting beyond said one contact face for engagement with the other contact face whereby said rib will be deformed into sealing engagement with said other contact face when the flanges are tightly connected by the bolts and the contact faces drawn into meeting relation, and bolts for maintaining the sealing member with its deformed rib in sealing engagement with said other contact face, the flexible seal permitting movement of the sealing member in the groove to maintain said sealing engagement upon separation of the contact faces due to distortion of the parts.

ERIC A. ZETTERQUIST.